Patented July 7, 1953

2,644,848

UNITED STATES PATENT OFFICE 2,644,848

PREPARATION OF CYCLOOCTATRIENE

Louis E. Craig, Washington, N. J., assignor to General Aniline & Film Corporation, New York, N. Y., a corporation of Delaware No Drawing. Application September 29, 1950, Serial No. 187,674

3 Claims. (Cl. 260—666)

This invention relates to an improved process for the preparation of cyclooctatriene by reduction of cyclooctatetraene. In accordance with the previously known procedure, cyclooctatriene was produced by reaction of cyclooctatetraene with lithium in ethyl ether to form a lithium adduct and the latter yielded cyclooctatriene upon reaction with an alcohol.

I have discovered that cyclooctatetraene can be more readily converted to cyclooctatriene by reduction with an alkali metal such as sodium, lithium or potassium, in liquid ammonia. The ammonia can be readily evaporated from the reduction mixture, and the alkali metal compounds (e. g., amides) as well as any excess alkali metal, can be destroyed, for example, by treatment with an alcohol or another reagent adapted to undergo mild reaction with the alkali metal and its amides. By washing the residue thus obtained with water, and fractional distillation, cyclooctatriene (more specifically, a mixture of 1,3,5- and 1,3,6-cyclooctatriene) is obtained in good yield.

My process is illustrated by the following example, wherein parts are by weight.

Example 52 parts of cyclooctatetraene were dissolved in 600 parts of liquid ammonia maintained at about −33° C., and 55 parts of metallic sodium in the form of small fragments were added over a period of about 5 hours, while agitating the mixture. The ammonia was then allowed to evaporate, and 700 parts of ethanol were added slowly over a period of several hours. The mixture was then heated to boiling under reflux for 2 hours, cooled, and poured into 500 parts of water. The resulting mixture was extracted exhaustively with petroleum ether, and the combined extracts dried over anhydrous sodium sulfate. The petroleum ether was distilled off, and the residue fractionally distilled under reduced pressure. 35 parts of a colorless distillate boiling at 87 to 87.5° C. at an absolute pressure of 110 mm. of mercury were recovered. This product absorbed 3 mols of hydrogen on exhaustive hydrogenation, thus indicating that it consisted essentially of cyclooctatriene. Examination of the ultra-violet spectrum of the product indicated it to be a mixture of the 1,3,5- and the 1,3,6- isomers, the former predominating. On redistillation, a product was obtained having a refractive index ($N_D^{25}$) of 1.5163. A maleic anhydride adduct of the product was also prepared, having a melting point of 139 to 141° C.

Since it has been found that the 1,3,6- isomer is isomerized by alkaline reagents to the 1,3,5- isomer, the proportions of the isomers in the product obtained by this process may vary.

In carrying out the process of the invention, the initial concentration of cyclooctatetraene in ammonia can vary, but is preferably from 5 to 25%. The temperature during the reduction is advantageously maintained at −60° to −33° C. (i. e., the boiling point of ammonia) so that the reaction can be carried out at atmospheric pressure. However, if superatmospheric pressure is applied, higher temperatures can be used, e. g. up to about 0° C.

The alkali metal employed can be sodium, potassium or lithium. The amount of this reagent should be at least 2 atomic equivalents per mol of cyclooctatetraene, an excess of at least 10% being preferably used. It is noted that despite the large excess of sodium employed in the foregoing example, the reduction did not proceed beyond the triene stage. Lesser amounts of sodium, e. g. 25 to 30 parts, can be used in the example to produce a similar yield.

In order to destroy and decompose alkali metal amides and excess alkali metal in the residue of the reduction mixture, an alcohol such as methanol or ethanol is advantageously employed. However, other compounds such as ammonium chloride or bromide, or ammonolysis catalysts such as iron, sodium nitrate or mercury can be used instead.

The cyclooctatriene obtained in accordance with this invention is valuable for further synthesis, such as formation of Diels-Alder adducts, homopolymers and copolymers, oxidation products such as peroxides, and other cyclooctane derivatives.

Variations and modifications which will be obvious to those skilled in the art can be made in the process specifically described without departing from the spirit or scope of the invention.

I claim:

1. A process for the production of cyclooctatriene which comprises reducing cyclooctatetraene with an alkali metal in the presence of liquid ammonia.

2. A process for the production of cyclooctatriene, which comprises reducing 1 mol of cyclooctatetraene with at least 2 atomic equivalents of an alkali metal in excess liquid ammonia, at a temperature from −60° to − 33° C., evaporating the ammonia from the mixture, decomposing the resulting alkali metal amides and destroying excess alkali metal in the residue, and recovering cyclooctatriene from the resulting mixture.

3. A process for the production of cyclooctatriene, which comprises reducing 1 mol of cyclooctatetraene with at least 2.2 atomic equivalents of sodium in liquid ammonia at atmospheric pressure, the initial concentration of cyclooctatetraene in liquid ammonia being from 5 to 25%, evaporating the ammonia from the reduction mixture, decomposing the resulting sodamide and destroying excess sodium by treatment with an alcohol, and recovering cyclooctatriene from the resulting mixture.

LOUIS E. CRAIG.

References Cited in the file of this patent

Kasansky et al., Bull. Acad. Sci. URSS (1938), pp. 1064 and 1072 abstracted in Chem. Abstracts, vol. 33, p. 6233.

Polymerization of Acetylene to COT, FIAT Final Report 967 (PB 62,593), p. 49, available May 28, 1947.

Cope et al., Jour. Am. Chem. Soc., vol. 72, pp. 2515–20 (pub. June 1950, received October 15, 1949).